(12) United States Patent
Hawkins

(10) Patent No.: US 7,290,218 B2
(45) Date of Patent: Oct. 30, 2007

(54) METHOD OF PROVIDING A USER INTERFACE FOR A DIGITAL CROSS-CONNECT SYSTEM

(75) Inventor: Richard C. Hawkins, Hampton, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 952 days.

(21) Appl. No.: 10/406,555

(22) Filed: Apr. 3, 2003

(65) Prior Publication Data

US 2004/0196309 A1  Oct. 7, 2004

(51) Int. Cl.
*G06F 3/00* (2006.01)

(52) U.S. Cl. .................... 715/810; 715/733; 715/748; 715/700

(58) Field of Classification Search .................... None
See application file for complete search history.

(56) References Cited

U.S. PATENT DOCUMENTS

| | | | | |
|---|---|---|---|---|
| 5,706,276 A | * | 1/1998 | Arslan et al. ............... | 370/216 |
| 5,867,689 A | * | 2/1999 | McLain, Jr. .................. | 703/23 |
| 5,954,829 A | | 9/1999 | McLain, Jr. et al. | |
| 5,956,324 A | | 9/1999 | Engdahl et al. | |
| 6,115,743 A | * | 9/2000 | Cowan et al. ............... | 709/224 |
| 6,128,759 A | * | 10/2000 | Hansen ........................ | 714/738 |
| 6,141,660 A | * | 10/2000 | Bach et al. ............. | 707/103 R |
| 6,957,263 B2 | * | 10/2005 | Galou et al. ................. | 709/227 |
| 7,010,782 B2 | * | 3/2006 | Narayan et al. ............. | 717/124 |
| 2002/0010908 A1 | * | 1/2002 | Cheng et al. .................. | 717/2 |
| 2002/0080445 A1 | * | 6/2002 | Falkenstein et al. ........ | 359/127 |
| 2003/0058835 A1 | | 3/2003 | Cho | |

* cited by examiner

*Primary Examiner*—Sy D. Luu
(74) *Attorney, Agent, or Firm*—Cantor Colburn LLP

(57) ABSTRACT

A method for providing a front-end user interface for a digital cross-connect system. The method comprises displaying a user selection menu and a command line. User input is received in response to the displaying. A TL1 command corresponding to the user input is transmitted for execution on the digital cross-connect system in response to the user input including the TL1 command in the command line or in response to the user input including a selection from the user selection menu. The TL1 command is displayed in response to the transmitting and output data is received from the digital cross-connect system in response to the transmitting. The output is displayed.

31 Claims, 16 Drawing Sheets

METHOD OF PROVIDING A USER INTERFACE FOR A DIGITAL CROSS-CONNECT SYSTEM

BACKGROUND OF THE INVENTION

The present disclosure relates generally to a method of providing a user interface for a digital cross-connect system and in particular, to a method of providing a user interface that communicates to a digital cross-connect system using the Transaction Language 1 (TL1) protocol.

Digital cross-connect systems are commonly utilized in medium to large central offices by telephone service providers and other communications companies to electronically connect T1s. The digital cross-connect system connects one T1 to another T1. Many cross-connect system manufacturers provide user interfaces that are text-only, dumb-terminal type interfaces that are reminiscent of early DOS-prompt personal computers. They typically utilize an industry standard mode of communication called Transaction Language 1 (TL1). TL1 only standardizes format and syntax, with the actual commands varying with each manufacturer. Central office personnel may have to work with up to twenty or more different types of telecommunication equipment, each having its own set of TL1 commands. In most cases, it is not necessary for the central office technicians to become experts on every piece of equipment located in the central office. However, a technician that is proficient in a variety of equipment types can quickly provision new circuits, quickly clear network problems and have a reduced need for help from technical support personnel.

Some manufacturers of cross-connect systems have developed graphical user interfaces (GUIs) to make the machine interfaces easier to use. These have proven useful but have also been the source of headaches for many technicians. Usually, the user of a GUI is completely removed from the TL1 interface and is using point-and-click on graphical depictions of the equipment. One problem with this method is that each network element can be configured differently and when a technician begins a session with the network element, the GUI must first retrieve the entire configuration so that it can properly depict the equipment. This can be frustrating for the technician who only needs to perform a brief task or has a major problem that must be addressed quickly. For most experienced technicians the trade-off of speed for usability is unacceptable. Further, the improved usability with a GUI is only realized after a long learning curve. Therefore, TL1 is usually the preferred method of interface by high-level technical support personnel because it is faster, more reliable and requires no special software. In addition, some technicians complain that they do not learn the TL1 interface because of their dependence on the GUIs.

BRIEF DESCRIPTION OF THE INVENTION

In an exemplary embodiment, a method for providing a user interface for a digital cross-connect system comprises displaying a user selection menu and a command line. User input is received in response to the displaying. A TL1 command corresponding to the user input is transmitted for execution on the digital cross-connect system in response to the user input including the TL1 command in the command line or in response to the user input including a selection from the user selection menu. The TL1 command is displayed in response to the transmitting and output data is received from the digital cross-connect system in response to the transmitting. The output is displayed.

Another aspect is a method for providing a user interface for a digital cross-connect system. The method comprises displaying a user selection menu and a command line. User input is received in response to the displaying. A TL1 command corresponding to the user input is transmitted for execution on the digital cross-connect system in response to the user input including the TL1 command in the command line or in response to the user input including a selection from the user selection menu. The TL1 command is a provision command in response to the selection including a provision TL1 option. The TL1 command is a facility report command in response to the selection including a facility report option. The TL1 command is a triple manager command in response to the selection including a triple manager option. The TL1 command is displayed in response to the transmitting.

In another aspect, a computer program product for providing a user interface for a digital cross-connect system comprises a storage medium readable by a processing circuit and storing instructions for execution by the processing circuit for performing a method. The method comprises displaying a user selection menu and a command line. User input is received in response to the displaying. A TL1 command corresponding to the user input is transmitted for execution on the digital cross-connect system in response to the user input including the TL1 command in the command line or in response to the user input including a selection from the user selection menu. The TL1 command is displayed in response to the transmitting and output data is received from the digital cross-connect system in response to the transmitting. The output is displayed.

In a further aspect, a system for providing a user interface for a digital cross-connect system comprises a digital cross-connect system, a user system and a host system. The host system is in communication with the digital cross-connect system and the user system and includes instructions to implement a method. The method comprises displaying a user selection menu and a command line on the user system. User input is received from the user system in response to the displaying. A TL1 command corresponding to the user input is transmitted for execution on the digital cross-connect system in response to the user input including the TL1 command in the command line or in response to the user input including a selection from the user selection menu. The TL1 command is displayed on the user system in response to the transmitting and output data is received from the digital cross-connect system in response to the transmitting. The output is displayed on the user system.

BRIEF DESCRIPTION OF THE DRAWINGS

Referring to the exemplary drawings wherein like elements are numbered alike in the several FIGURES.

DETAILED DESCRIPTION OF THE INVENTION

An embodiment of the present invention is directed to providing a windows based emulation program for a digital cross-connect system that is easy to use, provides job aids for the user and can be used efficiently by experts in the TL1 language. The user interface provided by an exemplary embodiment of the present invention combines common graphical user interface (GUI) features (e.g., point and click, cut and paste, drop-down menus) and the ability to enter native TL1 commands. The technician accessing the user interface has a choice of various manners to input a command without being removed from the TL1 interface. The user interface displays the TL1 commands that result from choices made by the technician through the GUI interface. This can allow the technician to learn and become more proficient with TL1. The technician will not have to worry about proper TL1 usage because the user interface guides the user through issues such as: is this the proper command; are there enough colons in the TL1 command; is the comma in the right place; and is this the right parameter for this command. In addition, the user interface allows the technician to customize the interface to suit individual preferences.

Figure 1:
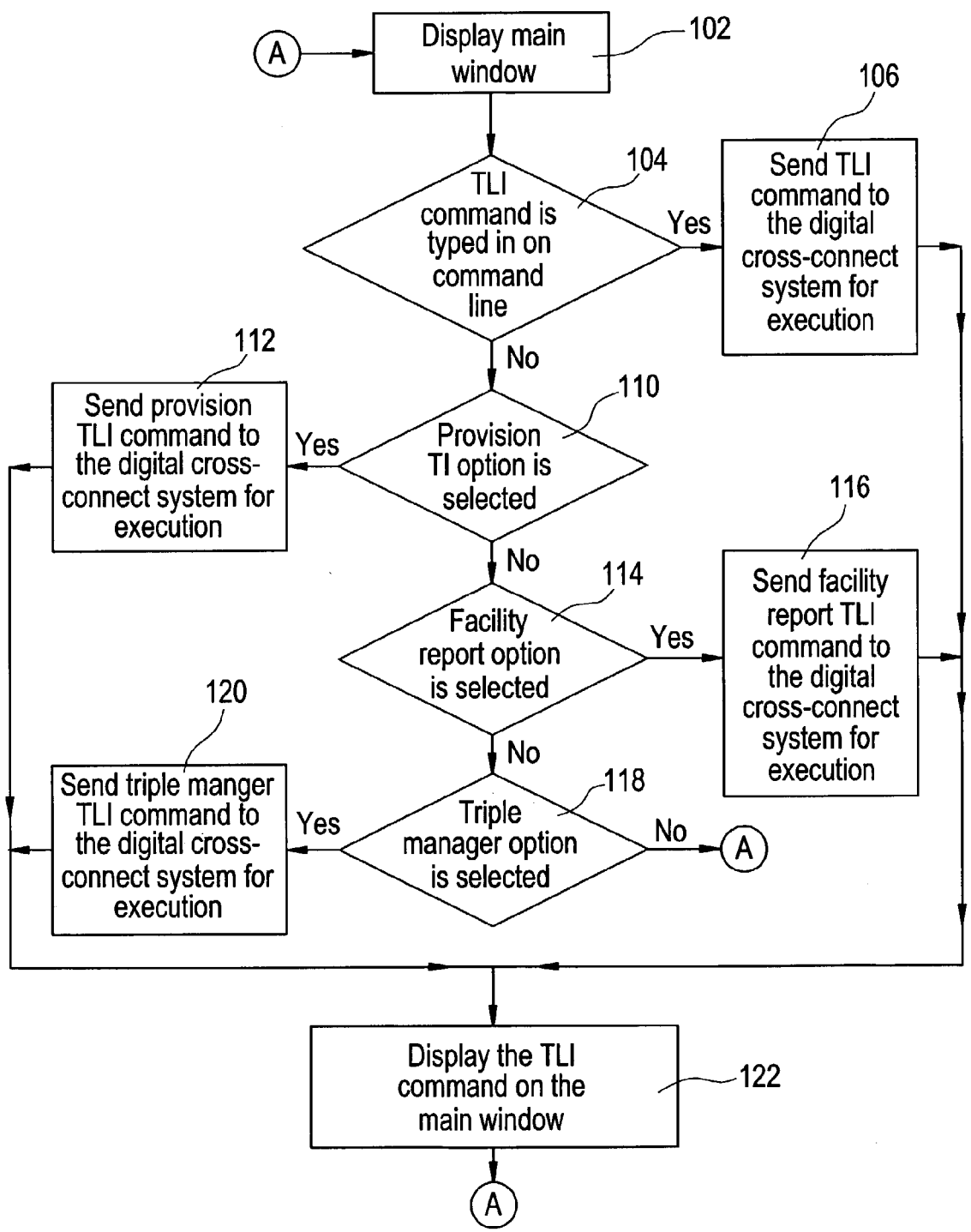
FIG. 1 is a block diagram of an exemplary embodiment of a process for providing a user interface for a digital cross-connect system.

FIG. 1 is a block diagram of an exemplary embodiment of a process for providing a user interface for a digital cross-connect system. The process begins at step 102, when the main window is displayed. The main window includes a command line, a main menu and a toolbar for inputting commands. The main menu and options available from the main menu and the toolbar are referred to collectively as a user selection menu. The main window also includes an area for displaying TL1 commands associated with user selections and for displaying output received from the digital cross-connect system in response to the TL1 commands. An exemplary embodiment of a main window, depicted in FIG. 2, will be described in a later paragraph. Next, at step 104, a check is made to determine if the user input was a TL1 command typed in on the command line in the main menu. If the user input was a TL1 command, then step 106 is performed, otherwise processing continues with step 110. The TL1 command, as typed in by the technician, is sent to the digital cross-connect system for execution at step 106. The TL1 command line input may be utilized by an expert in the TL1 lexicon for the particular cross-connect system and entry in this manner may be faster than utilizing the user selection menu. Once the command has been transmitted to the cross-connect system, processing continues with step 122.

Figure 3:
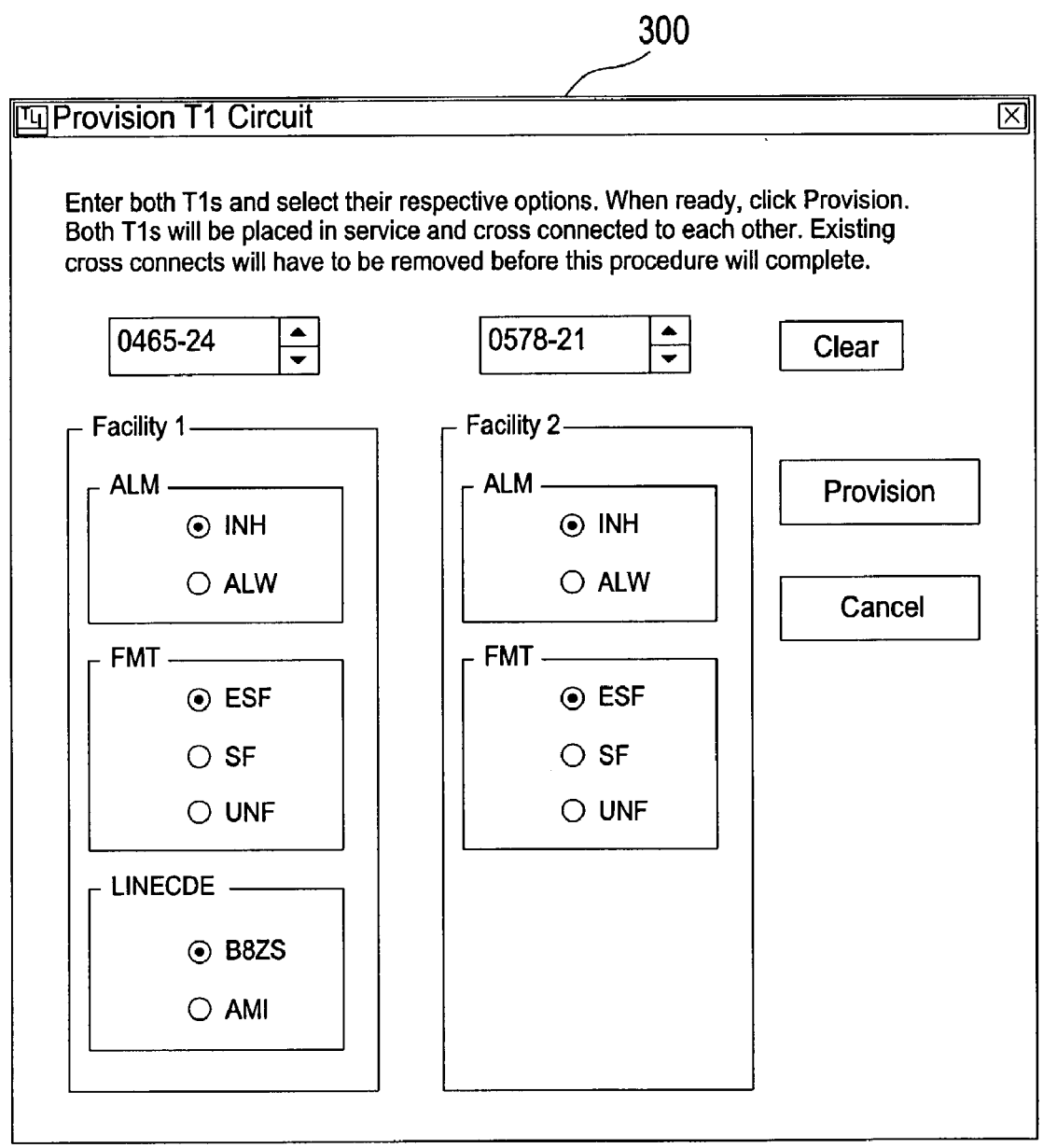
FIG. 3 is an exemplary embodiment of a user interface for selecting the T1s to be provisioned.
Figure 4:
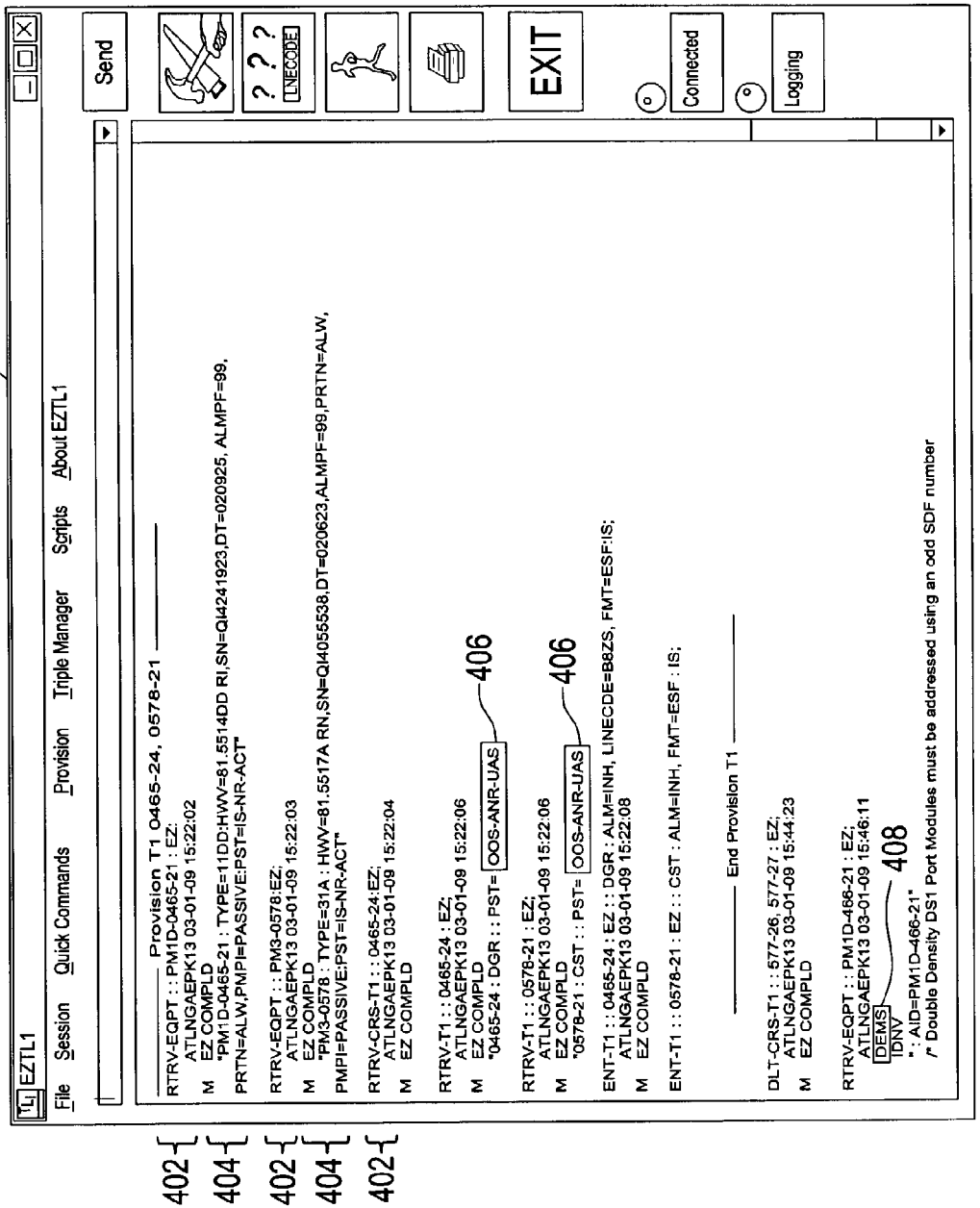
FIG. 4 is an exemplary embodiment of the output of a provision T1 circuit.

At step 110 in FIG. 1, it is determined if the provision option has been selected from the user selection menu. If provision has been selected, then step 112 is performed to send the provision TL1 command(s) to the digital cross-connect system for execution, otherwise processing continues at step 114. The provision TL1 command(s) sent to the digital cross-connect system is the result of a translation performed by the user interface application. The user interface application translates selections and input made by the user via the provision selection menu options into one or more TL1 commands specific to the digital cross-connect system. For example, selecting the provision T1 circuit command begins a process that sends several retrieval (RTRV) commands to the digital cross-connect system to retrieve the condition and current parameters for the two T1's entered in the dialog box. From the output information, a determination is made as to the next command to send to properly condition the T1 for service. Finally, a command is sent to the digital cross-connect system to cross-connect the two T1s to each other, enabling communication traffic to flow through the network element. Similarly, selecting the T1 facility command begins a process that sends RTRV commands to retrieve the current condition of a single T1. Based on information obtained from the output of these commands, a command is sent to change the T1 options to the options as selected by the user in the dialog box. Selecting the T3 facility command does the same thing as selecting the T1 facility except that it operates on T3 facilities. A T3 is a digital bit stream containing twenty-eight T1's. FIGS. 3 and 4, described in a later paragraph, depict an exemplary embodiment of provision T1 circuit input and output. When step 112 is completed, processing continues at step 122.

Figure 5:
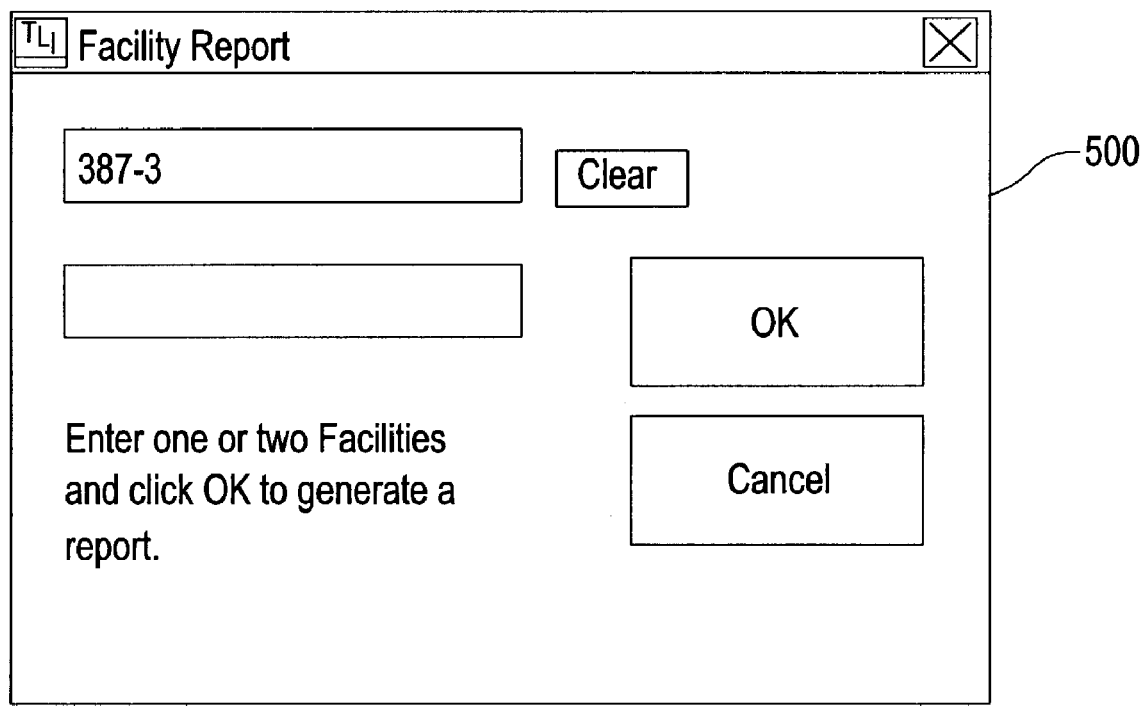
FIG. 5 is an exemplary embodiment of a user interface for creating a facility report.
Figure 6:
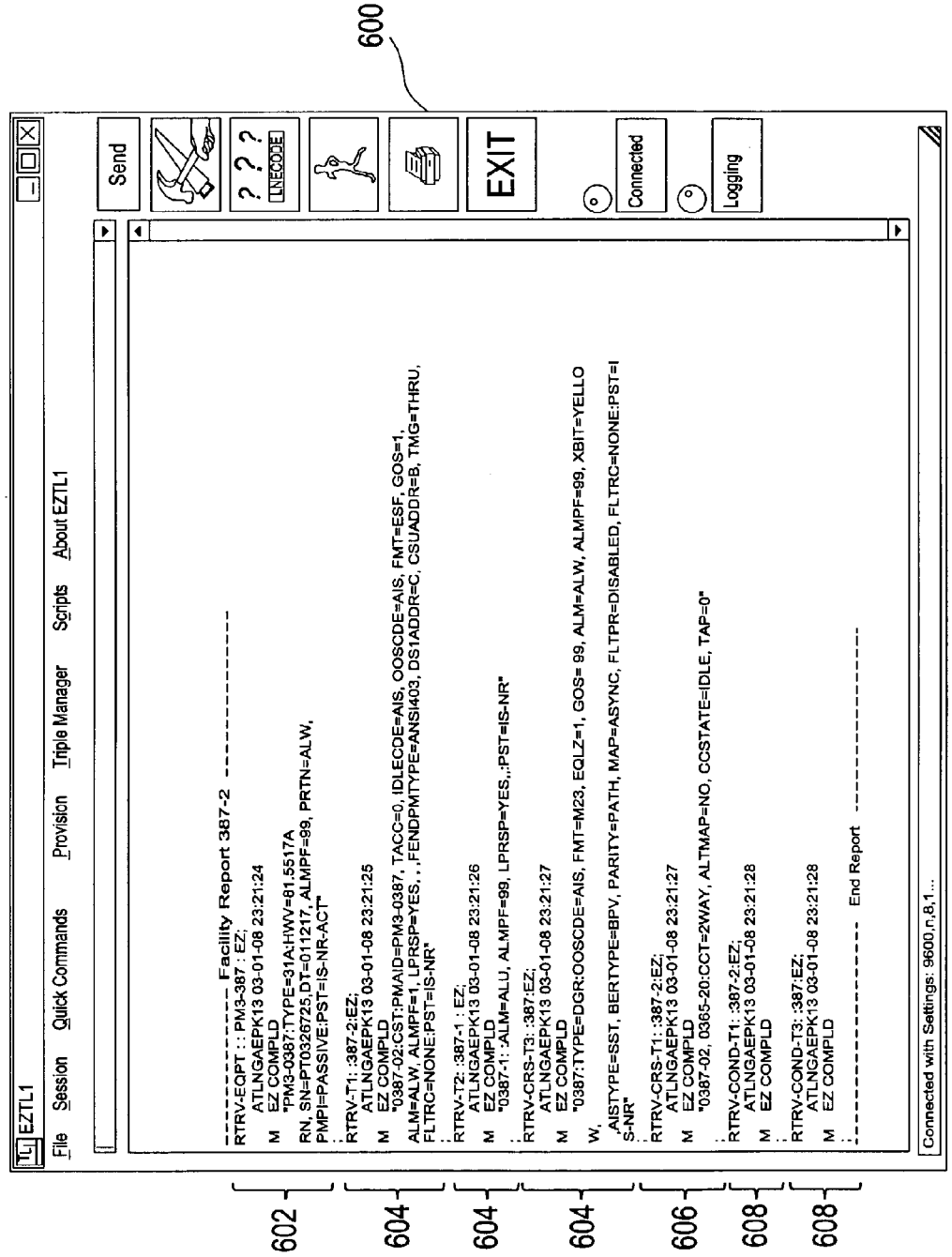
FIG. 6 is an exemplary embodiment of the output of a facility report.

At step 114, it is determined whether the user has selected the facility report option. If the technician has selected the facility report option, then step 116 is performed to send the facility report TL1 command(s) to the digital cross-connect system for execution, otherwise processing continues with step 118. The facility report TL1 command(s) sent to the digital cross-connect system is the result of a translation performed by the user interface application. The user interface application translates selections and input made by the user via the facility report selection menu options into one or more TL1 commands specific to the digital cross-connect system. Examples of inputs and outputs for the facility report option are depicted in FIGS. 5 and 6, and are described in a later paragraph. Once step 116 is completed, processing continues at step 122.

At step 118, a check is made to determine if the triple manager option has been selected from the main window. If the triple manager option has been selected, then step 120 is performed to send the associated triple manager TL1 command(s) to the digital cross-connect system for execution, otherwise processing continues at step 102. The triple manager TL1 command(s) sent to the digital cross-connect system is the result of a translation performed by the user interface application. The user interface application translates selections and input made by the user via the triple manager selection menu options into one or more TL1 commands specific to the digital cross-connect system. FIGS. 7-10, described in a later paragraph, depict an exemplary embodiment of triple manager input and output. When step 120 is completed, processing continues at step 122. At step 122, the TL1 input commands that are sent to the digital cross-connect system are also displayed on the main menu. In this manner, the technician can learn the TL1 language while using the graphical user interface and help facilities as provided by the user interface. In an alternate exemplary embodiment, data transmitted back from the digital cross-connect system is also displayed. The input by the technician may be displayed in a first color and the resulting responses back from the cross-connect system, or output, may be displayed in a second color for ease in interpretation by the technician.

Figure 2:
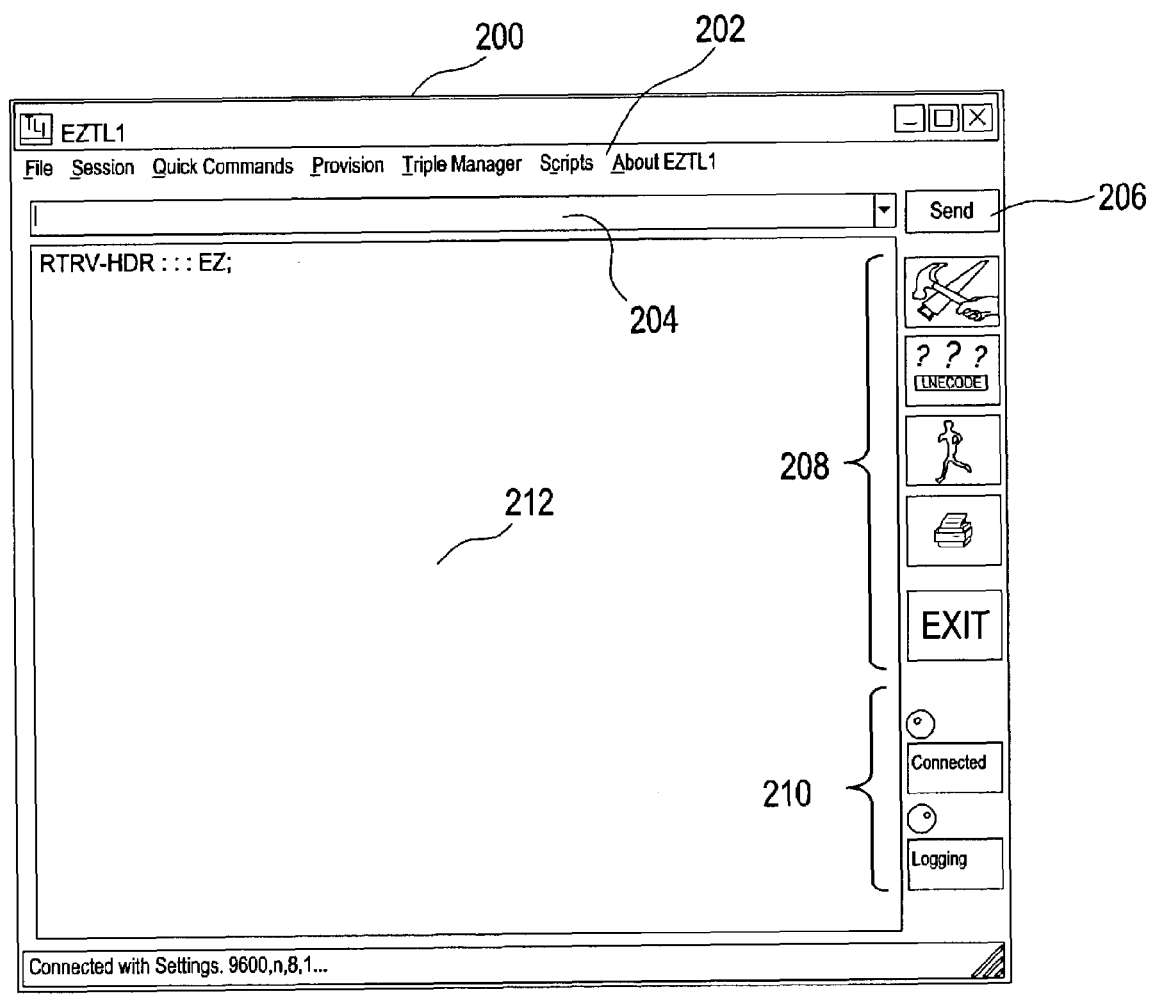
FIG. 2 is an exemplary embodiment of a user interface for a digital cross-connect system.

FIG. 2 is an exemplary embodiment of a user interface for a digital cross-connect system. FIG. 2 depicts a graphical user interface main window 200 that is presented to the technician when the user interface is initiated. The main menu 202 and the toolbar 208 comprise the user selection menu. Selecting a main menu option may result in a pull-down menu with more options being displayed. In the exemplary embodiment depicted in FIG. 2, the main menu 202 includes: a file option; a session option; a quick commands option, a provision option, a triple manager option, a scripts option and an about EZTL1 option that displays a program information screen. In the embodiment depicted in FIG. 2, the user interface application is referred to as "EZTL1." In an exemplary embodiment of the present invention, the file option includes a pull-down menu containing a start logging command that opens a dialog window that allows the user to open a new or existing log file and begin recording all input and output activity. Also included in the file option may be a stop logging command that closes the currently open log file and stops the recording process. The file option could also include a print log file command and an exit command to close the user interface.

In an exemplary embodiment of the present invention, the session option on the main menu 202 includes a pull-down menu that contains a connect command that opens the communication port on the computer and attempts to establish communications with the network element (e.g., the digital cross-connect system). In an exemplary embodiment of the present invention, the connect command is performed by sending a "RTRV-HDR:::EZ;" TL1 command to the network element. If a response is received then the login dialog window is displayed. Another option on the session pull-down menu is the disconnect command that closes the communication port for the computer, ending communications with the network element. The session pull-down menu may also include a logon command that may be selected to log a user back on when the user has been logged off due to inactivity. A logoff command on the session pull-down menu sends the appropriate logoff command to the network element. Another option on the session pull-down menu may be a change user alias command. This command opens a dialog box that allows the user to change the current alias. Using an alias is optional to the user. In an exemplary embodiment of the present invention, the alias is a three character code identifying the user and it is appended to "EZ" and placed in the correlation tag field of each sent command. For example, if the current alias is "HAR", the TL1 RTRV_HDR command in an exemplary embodiment of the present invention would be "RTRV-HDR:::EZHAR;." Additional pull-down menu selections from the session option on the main menu 202 may include: communication port properties for allowing a user to make changes to the computer communication port settings such as speed, parity and stop bits; access properties to allow the user to change settings such as response timeout, default user identification and default password; and shelf configuration for allowing the user to identify the type of equipment used in each port module shelf of the network element. Information from the shelf configuration option is used by the program to determine the proper command to send when running several of the pre-built scripts (e.g., provision T1, triple manager).

Additional user selection menu options are included in the toolbar 208 depicted in FIG. 2. The toolbar 208 includes a command builder icon, an output definition icon; a script runner icon, a print icon and an exit icon for exiting the user interface application. A technician may choose any of the user selection options by utilizing conventional Windows and/or GUI techniques. Also included in FIG. 2 is a TL1 command line 204 and a send button 206. The command line 204 may be utilized by an experienced technician who does not need to be prompted through the GUI interface. The technician may enter a TL1 command into the command line 204 and select the send button 206. This will result in the TL1 command being transmitted to the digital cross-connect system. Entering a command in this manner may be more efficient for an experienced technician. In addition, the main window 200 includes status lights 210 that indicate the connection status and whether or not logging is turned on. If logging is turned on by the user, all input and output text will be saved to a standard text file for review or printing at a later time. Also included in the main window 200 is an input/output box 212 for displaying the actual TL1 commands that are transmitted to the digital cross-connect system. In this manner, a technician utilizing the user selection menu options can view the TL1 commands generated by the user interface in response to technician selections. In addition, the input/output box 212 may be utilized to display output received from the digital cross-connect system. The technician may select text from the input/output box 212 and click the definitions icon from the toolbar 208 to retrieve a definition of the selected text. Different installations may implement user interfaces that are different than the one depicted in FIG. 2. For example, the user interface may include only a subset of the user selection menu options depicted in FIG. 2 or it may include the same options but configured differently with different naming conventions. In addition, other menu options may be added to the user selection menu and the layout of the screen may be different.

FIG. 3 is an exemplary embodiment of a user interface for selecting a T1 circuit to be provisioned. The screen depicted in FIG. 3 is displayed when the user selects the T1 circuit option from the pull-down menu associated with the provision option on the main menu 202. The provision T1 circuit feature automates the task of provisioning a T1 and helps to ensure proper provisioning in a relatively short time frame. The provision T1 screen 300 depicted in FIG. 3 is displayed at step 112 in FIG. 1 to create the provision TL1 circuit command(s) to be sent to the digital cross-connect system. The technician is prompted to enter two T1s (either by typing them in or scrolling through a list of T1s) and is also prompted to select their respective options. The provision T1 screen 300 includes help text at the top to guide the user through the process. Once the technician has input the required data, selecting the provision button will properly option, place in service and cross-connect the specified T1 addresses (in this example "0465-24" and "0578-21"). The TL1 commands sent to the digital cross-connect system will vary depending on the port module type, the equipment state and the facility state. If the port module is unequipped or a cross-connect already exists for either address, the script stops and informs the user of the problem through the input/output box 212. Once the problem is corrected, the technician can perform the procedure again to completion. Before selecting the provision button, the technician can always cancel the provision by selecting the cancel button. Prior to performing a provision command, preferably the first time the user interface application is executed, the technician should enter all port module shelves into the system. The port module shelves may be entered through selecting the pull-down menu associated with the session option on the main menu 202. Port module shelf data should also be updated each time a new port module shelf is grown. Updating the port module shelf data can help to ensure accurate results when performing the provision and facility report options.

FIG. 4 is an exemplary embodiment of the output of a provision T1 circuit. The provision T1 circuit output screen 400 includes both the TL1 commands created by the user action, or inputs 402, and the TL1 data received from the digital cross-connect system, or outputs 404. In general, outputs from the digital cross-connect system report the settings for a given piece of equipment or facility address. They may also report the present state (PST) of the given equipment or facility. The PST indicates whether or not the equipment or facility is in-service (IS) (carrying traffic) or out-of-service (OOS), equipped or unequipped, normal or abnormal (alarm condition), and in the case of facilities assigned or unassigned. Outputs in response to a manual input may be preceded by an "M" and outputs automatically generated may be preceded by an "A". Outputs may also indicate whether or not an input command was successfully executed. In an exemplary embodiment, inputs 402 are displayed in blue and outputs 404 are displayed in green. Abnormal or alarm conditions are displayed in various colors and become closer to red (e.g., along a color range of yellow to orange to red) as the severity increases. A critical alarm message may be displayed in pure red while an out-of-service message 406 may be displayed in orange. In addition to color-coding alarms and abnormal conditions, the DENY response message 408 is color-coded orange. Color-coding makes important output stand out so that it will receive proper attention.

In addition to provisioning a T1 circuit, an embodiment of the present invention may be utilized to provision a T1/Virtual Tributary 1 (VT1) facility and a T3/Synchronous Transport Signal 1 (STS1) facility by selecting these options from the pull-down menu associated with the provision option on the main menu 202. Selecting the provision T1/VT1 facility opens a provision T1 facility dialog box. The user may then enter a single T1 or VT1 port and pick the available options (e.g., format (FMT), present state (PST), MODE (mode), ALM (alarm), TACC (test access), GOS (grade of service), ALMPF (alarm profile), a T1 that is physically connected as a single T1 (DGR)) for that port. The user may also optionally place the port in-service or out-of-service. In response to user input, a script of commands is sent to the digital cross-connect system. The commands will retrieve the state of equipment and facilities relative to the port specified and send a command to make the selection option changes. Selecting the T3/STS1 option opens a provision T3 facility dialog box. The user may then enter a single T1 or STS1 port and pick the available options for the port (e.g., ALM, PST, MODE, TACC). The user may also optionally place the port in-service or out-of-service. In response to user input, a script of commands is sent to the digital cross-connect system. The command retrieves the state of the equipment and facilities relative to this port and sends a command to make the selected option changes.

FIG. 5 is an exemplary embodiment of a user interface for creating a facility report. This facility report screen 500 as depicted in FIG. 5 is displayed at step 116 in FIG. 1 in response to a technician selecting the facility report option from the script option sub-menu on the main menu 202. The facility report feature allows the user to input any valid facility port(s) and generate a complete report of alarms, conditions and cross-connects related to that facility. This may be used for troubleshooting and for verifying that a new service has been provisioned correctly. The facility report is a script of RTRV commands for the specified facility, related facilities and related equipment. Any type of facility may be entered (e.g., T1, VT1, T3, STS1). The commands sent to the digital cross-connect system will vary depending on the type(s) of facility(s) entered. The facility report screen 500 prompts the user to enter one or two facilities for generating facility reports. The report will vary depending on the type of facility entered, but in general the report will retrieve pertinent information regarding the facility(s) entered.

FIG. 6 is an exemplary embodiment of the output of a facility report. The facility report output screen 600 includes both the TL1 commands transmitted to the digital cross-connect system and the output data received from the digital cross-connect system. The script created by the user interface application and executed in this example includes RTRV equipment commands 602; RTRV T1, T2, T3 commands 604; RTRV CRS commands 606 and RTRV COND commands 608. The facility report output screen 600 is displayed in the input/output box 212 on the main window 200.

Figure 7:
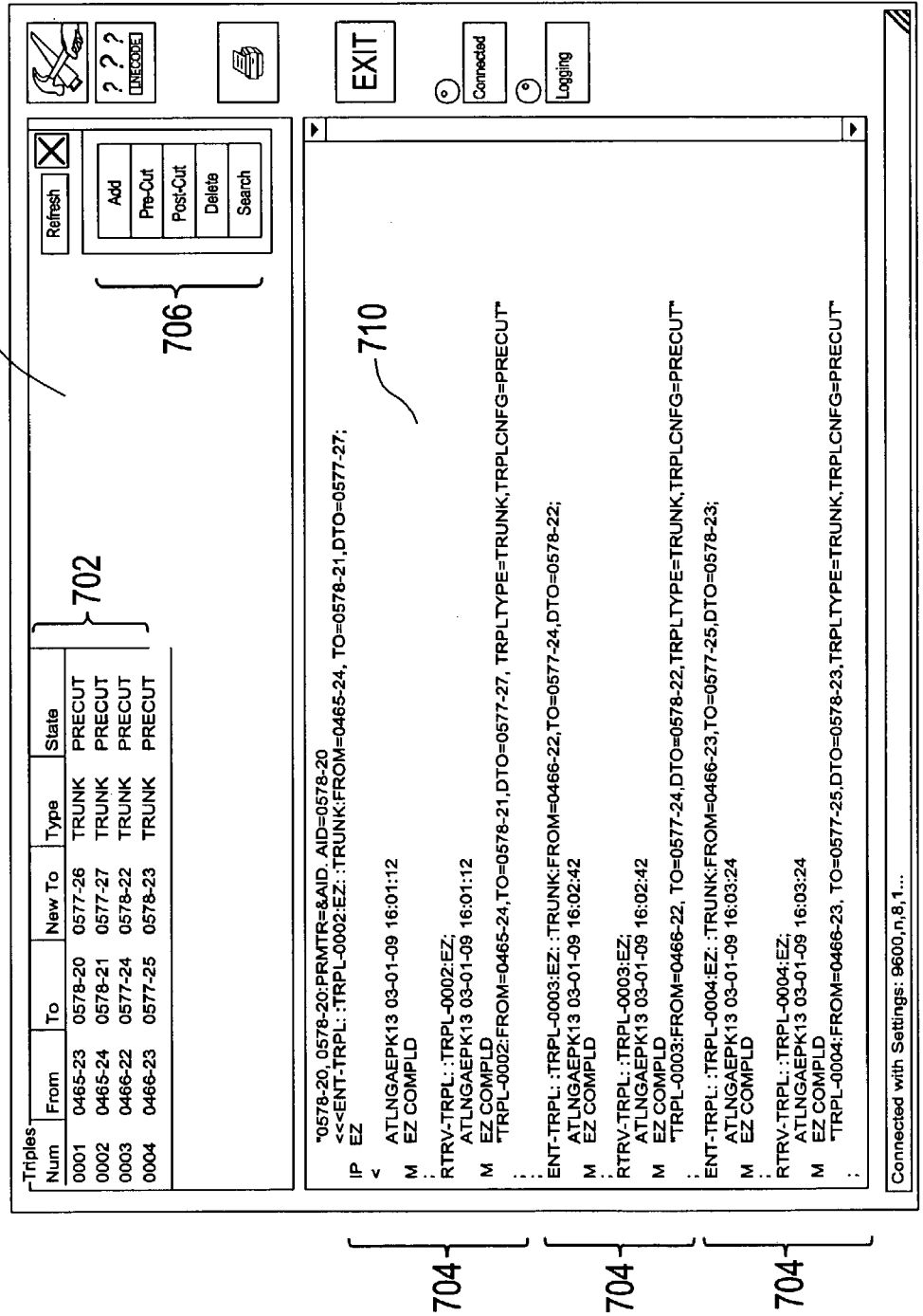
FIG. 7 is an exemplary embodiment of a user interface for the triple manager.

FIG. 7 is an exemplary embodiment of a user interface for the triple manager. The triple manager report screen 700 as depicted in FIG. 7 is displayed at step 120 in FIG. 1 in response to a technician selecting the triple manager option from the main menu 202. The triple manger feature helps the technician retrieve and manage triples. Triples are utilized to reroute traffic when performing facility rearrangements and replacing old equipment. Triples are arrangements of three T1 addresses. They are used to reroute traffic with minimal or no downtime. The triple manager option in the main menu 202 portion of the user selection menu allows the technician to retrieve and reconfigure triples with point and click simplicity. When a technician selects the triple manager option from the main menu 202, a new frame 708 is opened at the top of the input/output box 212. In an exemplary embodiment of the present invention, the program sends a RTRV-TRPL::ALL:EZ;" command to the digital cross-connect system. If any triples exist in the network element they are displayed in a spreadsheet-like grid 702 in the new frame 708. The user may then select a triple from the grid 702 and manipulate the state of that triple with buttons 706 on the right hand side of the screen. If the list of triples is very long, the user may find a specific triple by using the search button in the menu of options 706. The refresh button in the list of buttons 706 retrieves a fresh list of triples from the network element by clearing the grid and sending the RTRV-TRPL::ALL:EZ;" command again. All input and output is displayed in the input/output section 710 just below the triple manager frame 708. Should a problem occur once traffic has been rerouted, the triple manager enables the user to quickly return the configuration to the pre-cut arrangement. In triples, the three T1 address, as shown in triple input box 702 are called "from", "to", and "new to". Three types of triples may be configured: line, trunk and cross connects that allow for the removal of digital equipment (referred to as MDX).

The example depicted in FIG. 7 is a trunk type triple. Based on the data in the triple input box 702, the TL1 input commands and output commands, from the digital cross-connect system, for each triple will be similar to the three groupings of input and output data 704 shown in the output display area. For example, the second grouping of input and output data 704 includes an input TL1 command to enter a triple. This input command is sent to the digital cross-connect system. Next, an output message from the digital cross-connect system verifies that the triple has been entered. The next TL1 input command is a request for the digital cross-connect system to retrieve the triple command. The resulting output message from the digital cross-connect system is the triple. In this manner, a technician may verify that the correct triple was recorded by the digital cross-connect system. The report screen 700 depicted in FIG. 7 also includes a menu of options 706 for the technician. The technician may choose to add a triple, put the triple back to the original pre-cutover configuration; initiate the cut-over to reroute traffic; delete a triple or search for a triple. The triples report screen 700 may be navigated utilizing typical GUI or Windows based actions (e.g., point-and-click, pull-down menus).

Figure 8:
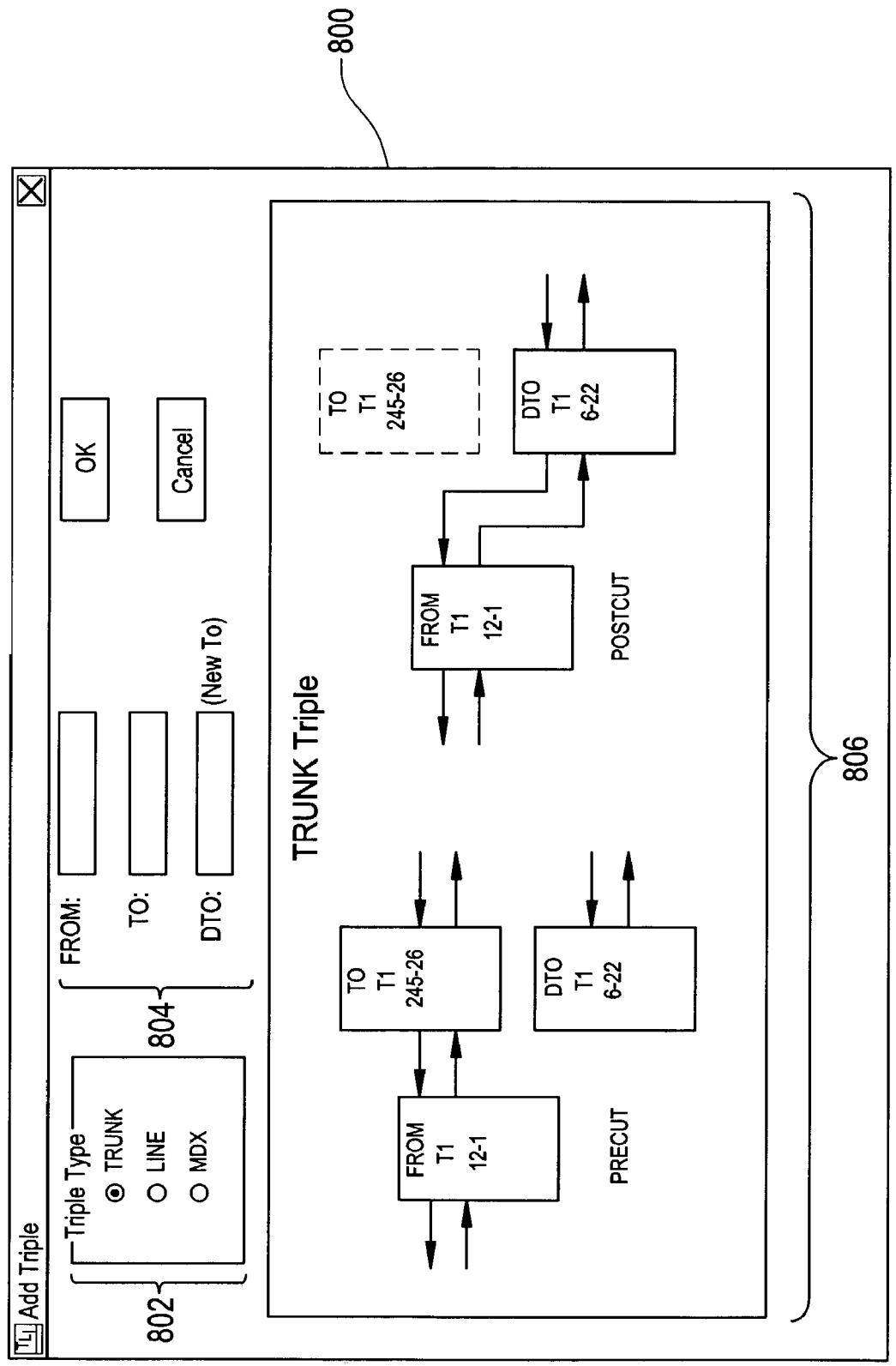
FIG. 8 is an exemplary embodiment of a user interface for adding a new triple and for displaying the pre-cut and post-cut views for a trunk triple.
Figure 9:
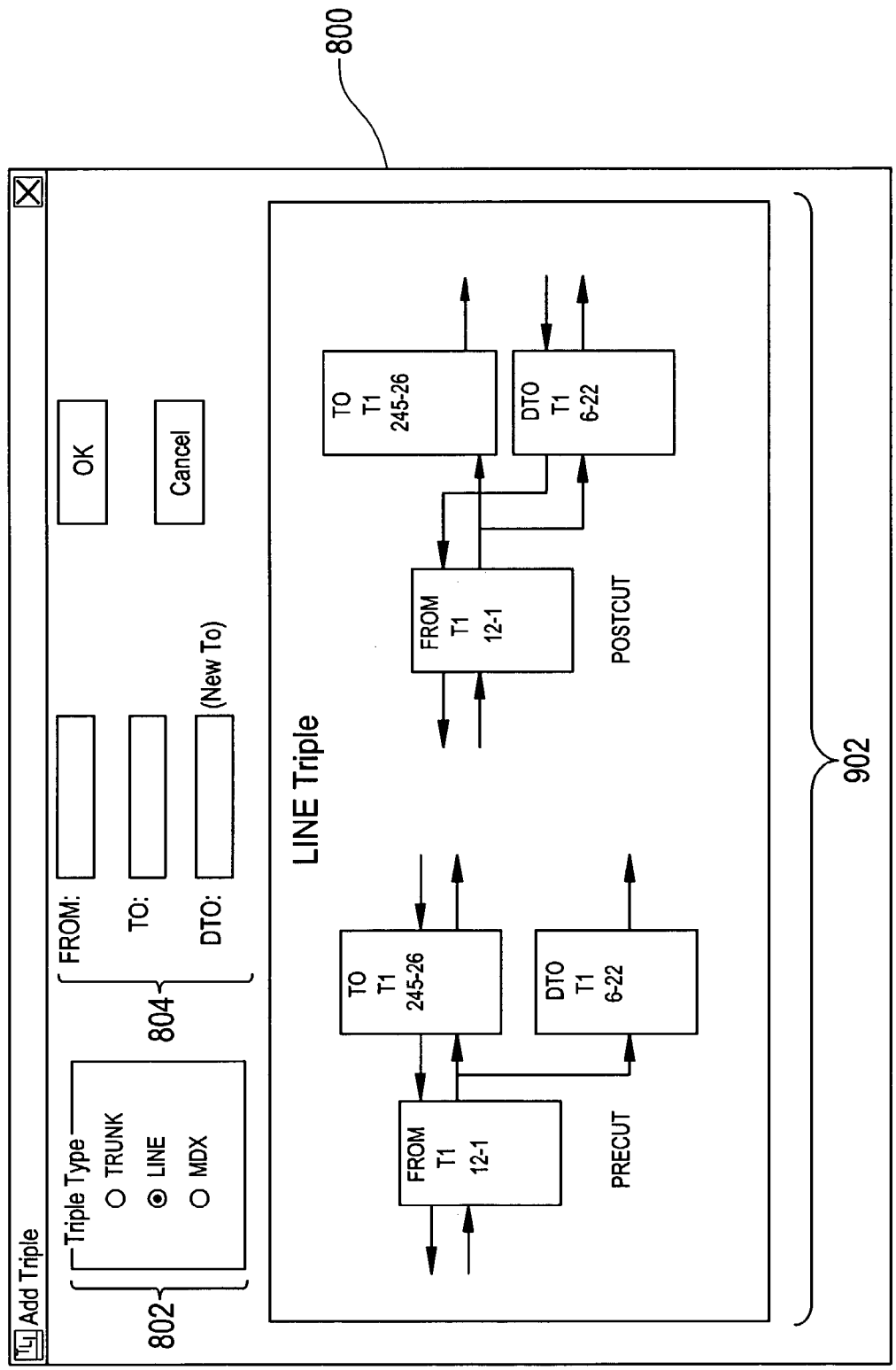
FIG. 9 is an exemplary embodiment of a user interface for the visual depiction of the pre-cut and post-cut views for a line triple.
Figure 10:
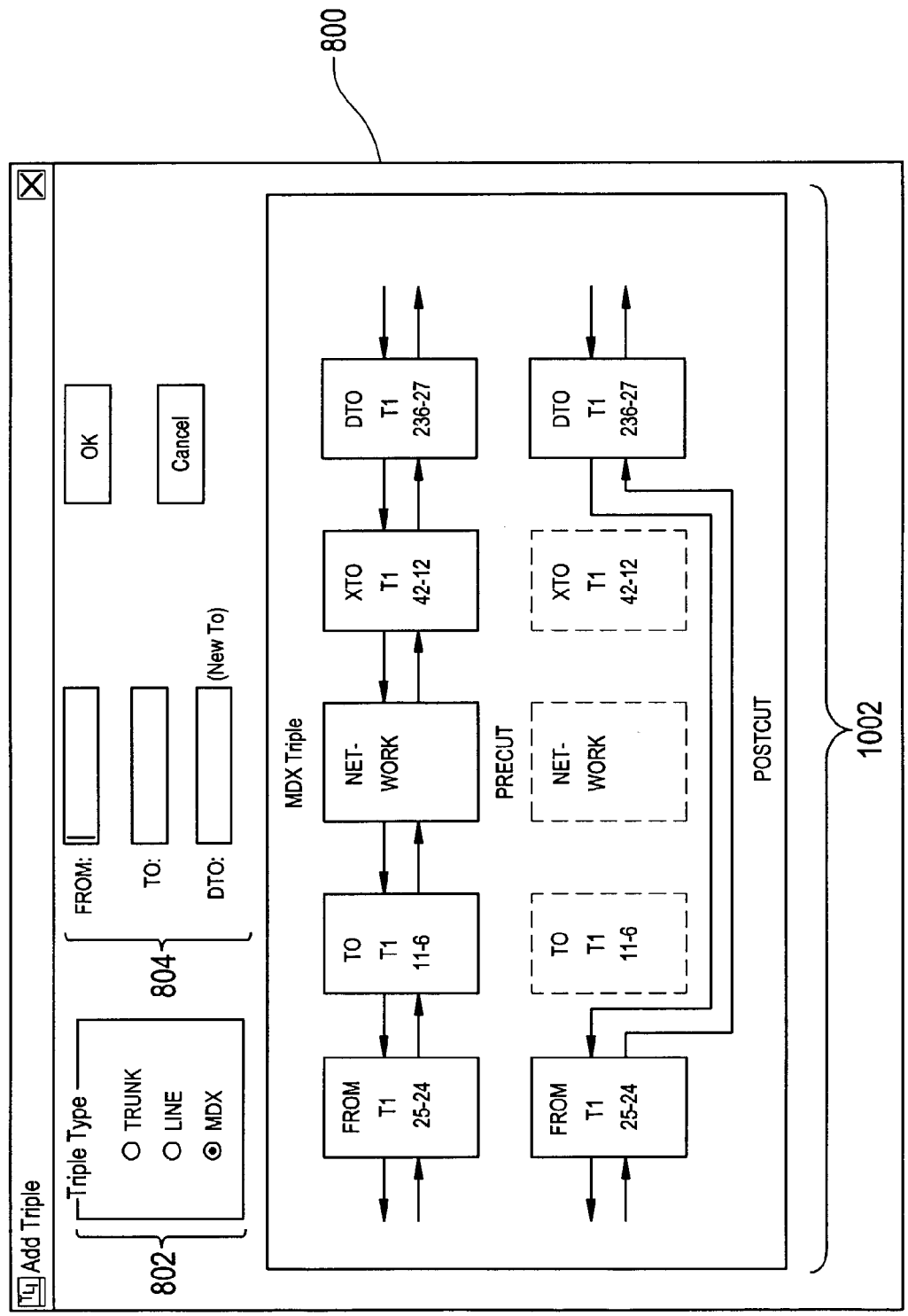
FIG. 10 is an exemplary embodiment of a user interface for the visual depiction of the pre-cut and post-cut views for a MDX.

FIG. 8 is an exemplary embodiment of a user interface for adding a new triple and for displaying a visual depiction of the pre-cut and post-cut views. The add triple screen 800 depicted in FIG. 8, includes a triple selection menu 802 to select between a trunk triple, a line triple and an MDX triple. In this example, the trunk triple is selected from the triple selection menu 802. The add triple screen 800 also includes input boxes 804 for the technician to enter the "from" trunk, the "to" trunk and the "DTO" or "new to" trunk. In response to the user input the user interface software will create a visual depiction of the pre-cut and post-cut views such as the one depicted in the trunk triple diagram 806 section of the add triple screen 800. FIG. 9 is an exemplary embodiment of a visual depiction of the pre-cut and post-cut views for a line triple diagram 902. FIG. 10 is an exemplary embodiment of the pre-cut and post-cut views for a MDX triple diagram 1002.

Using an exemplary embodiment of the present invention, TL1 commands may be entered and transmitted to a digital cross-connect system in a variety of manners. The technician could simply type the command into the command line and send it to the digital cross-connect system. Alternatively, the technician could use quick commands by selecting a command from a drop-down menu filled with user-customized commands. The technician could also use the provision T1 feature, the command builder feature or the facility report feature by selecting the corresponding option on the user selection menu. Another way that the technician may enter and transmit a TL1 command is by selecting the command from the command history. Finally, the technician could use the triple manager to enter a command. A technician could select among these options depending upon his proficiency with the TL1 language for the particular system and the speed with which the command must be entered. In an exemplary embodiment of the present invention, the digital cross-connect system is a Titan 5500 from Tellabs and the TL1 commands are tailored for this system.

Figure 11:
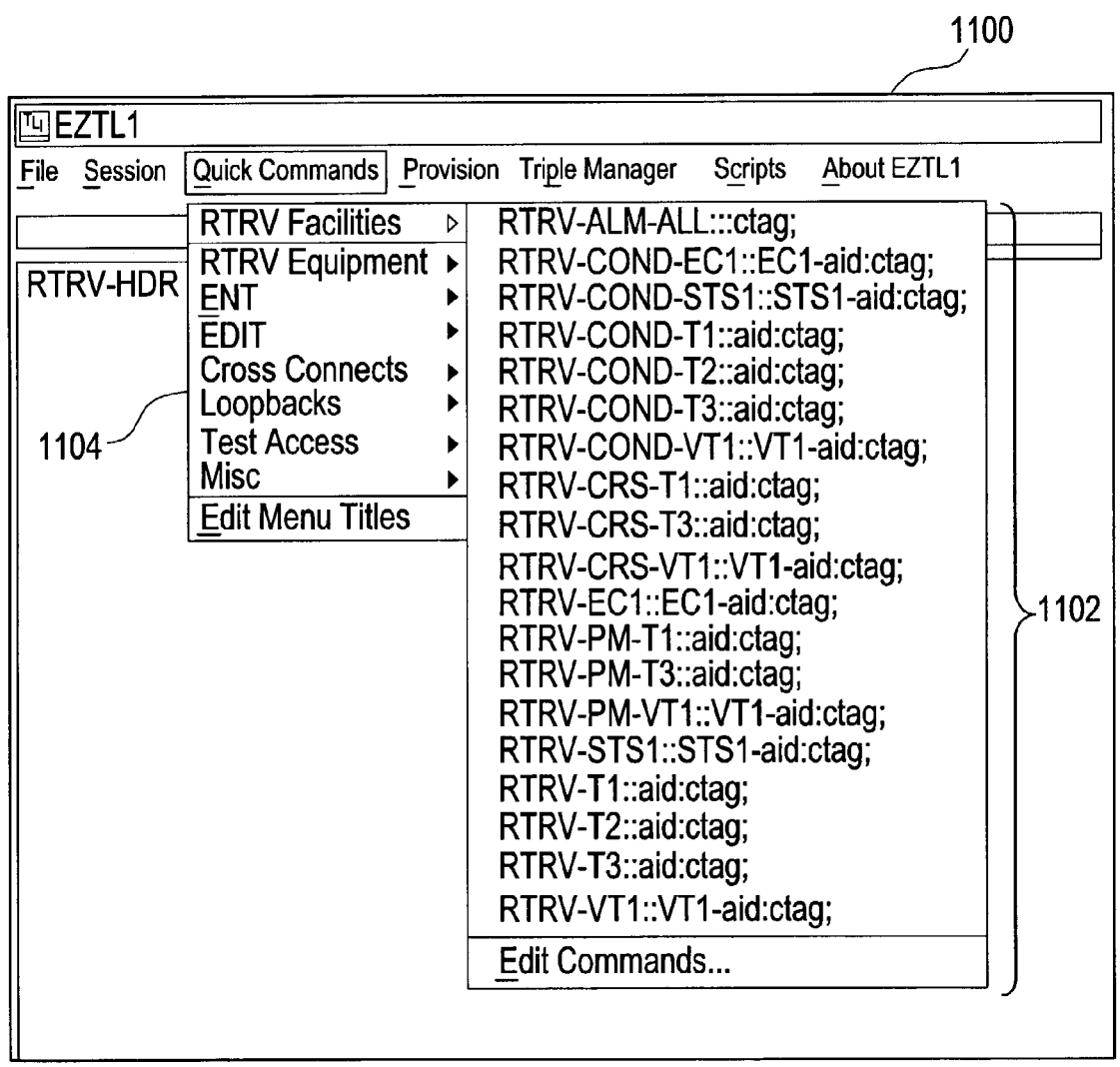
FIG. 11 is an exemplary embodiment of a user interface for accessing quick commands.

FIG. 11 is an exemplary embodiment of a user interface for accessing quick commands. Using quick commands, the technician may customize and save up to two-hundred quick commands in drop-down menus. The quick command option on the main menu 202 drops down to a pull-down menu 1104 that includes up to eight sub-menus. Each sub-menu drops down to a menu list 1102 containing up to twenty-five user defined commands. The title for each of the sub-menus may be changed by the user clicking the edit menu titles option on the pull-down menu. In addition, the user may edit the commands by clicking "edit commands" which appears at the bottom of each menu list 1102. This allows the technician to reenter commonly used commands by picking them from the menu list 1102. In the exemplary embodiment depicted in FIG. 11, the menu list 1102 is associated with the RTRV facilities sub-menu on the pull down menu 1104. The string "aid" (stands for address ID) is used as a placeholder for further user input before the command is actually sent to the digital cross-connect system. If a quick command contains the placeholder "aid", the user will be prompted for an address ID. As the user types, the placeholder will be replaced with the user input. The command can then be sent or cancelled. In an exemplary embodiment, if the quick command ends with a "!", the user will be prompted with a service affecting caution before the command is sent. The user will be warned that the command may be service affecting and then the user is given the opportunity to cancel the command. The "!" is automatically replaced with a ";" as the command is sent to the digital cross-connect system. Alternate embodiments of the quick commands user interface include different numbers of sub-menus (e.g., four, twelve, twenty) and different numbers of user defined commands per sub-menu (e.g., ten, thirty).

Figure 12:
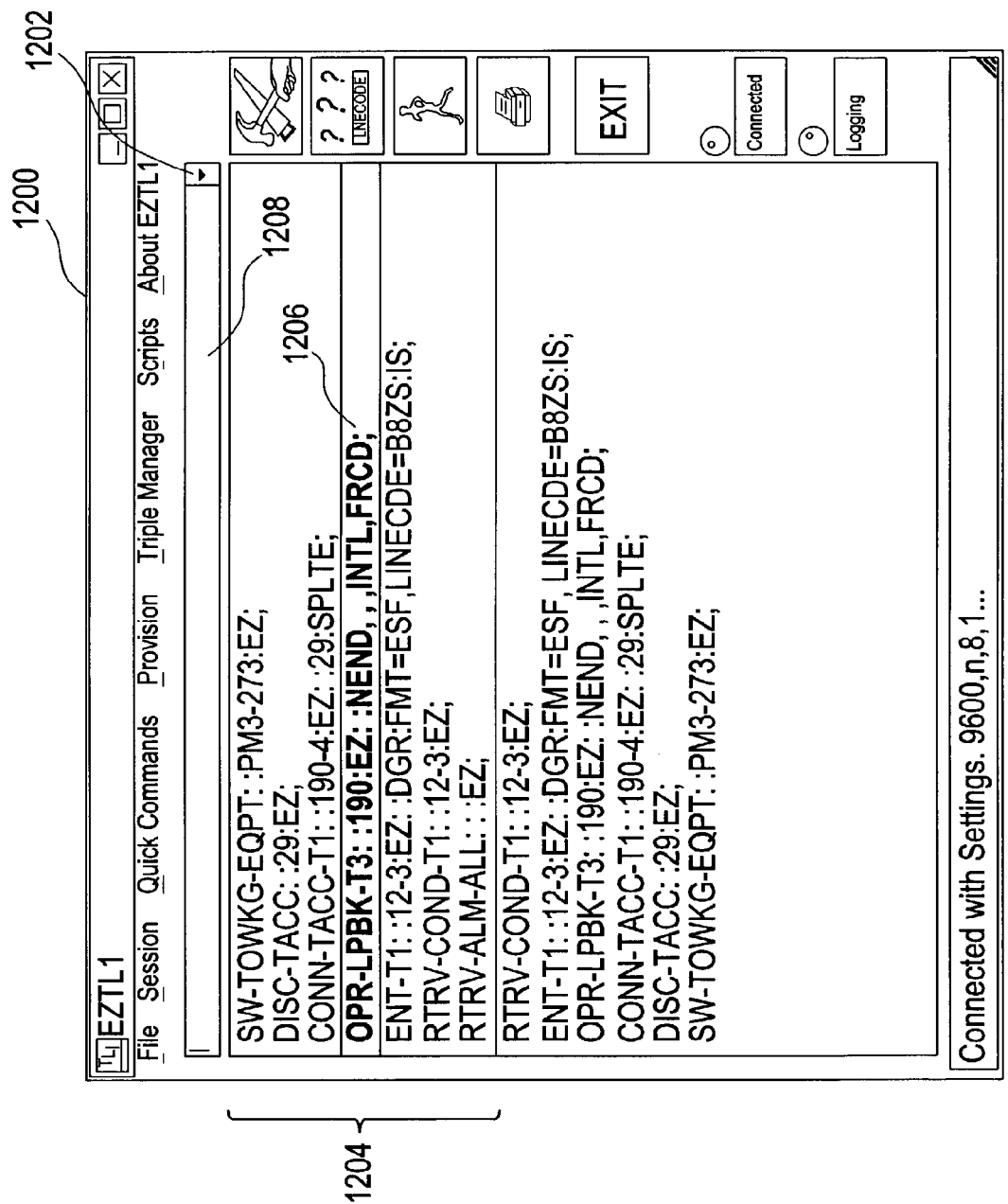
FIG. 12 is an exemplary embodiment of a user interface for selecting a command from previously entered commands.

FIG. 12 is an exemplary embodiment of a user interface for selecting a command from the previously entered commands, or command history. It may be utilized when it is desirable to reenter a previously entered command. Using an embodiment of the present invention, this can be easily accomplished without having to retype the command. When the user selects the down arrow 1202 next to the command line 1208, a list of commands 1204 including the last twenty commands that have been input is displayed. The technician may select a command 1206 from the list of commands 1204 and the command 1206 will be copied into the command line 1208 and transmitted to the digital cross-connect system upon user instruction.

Figure 13:
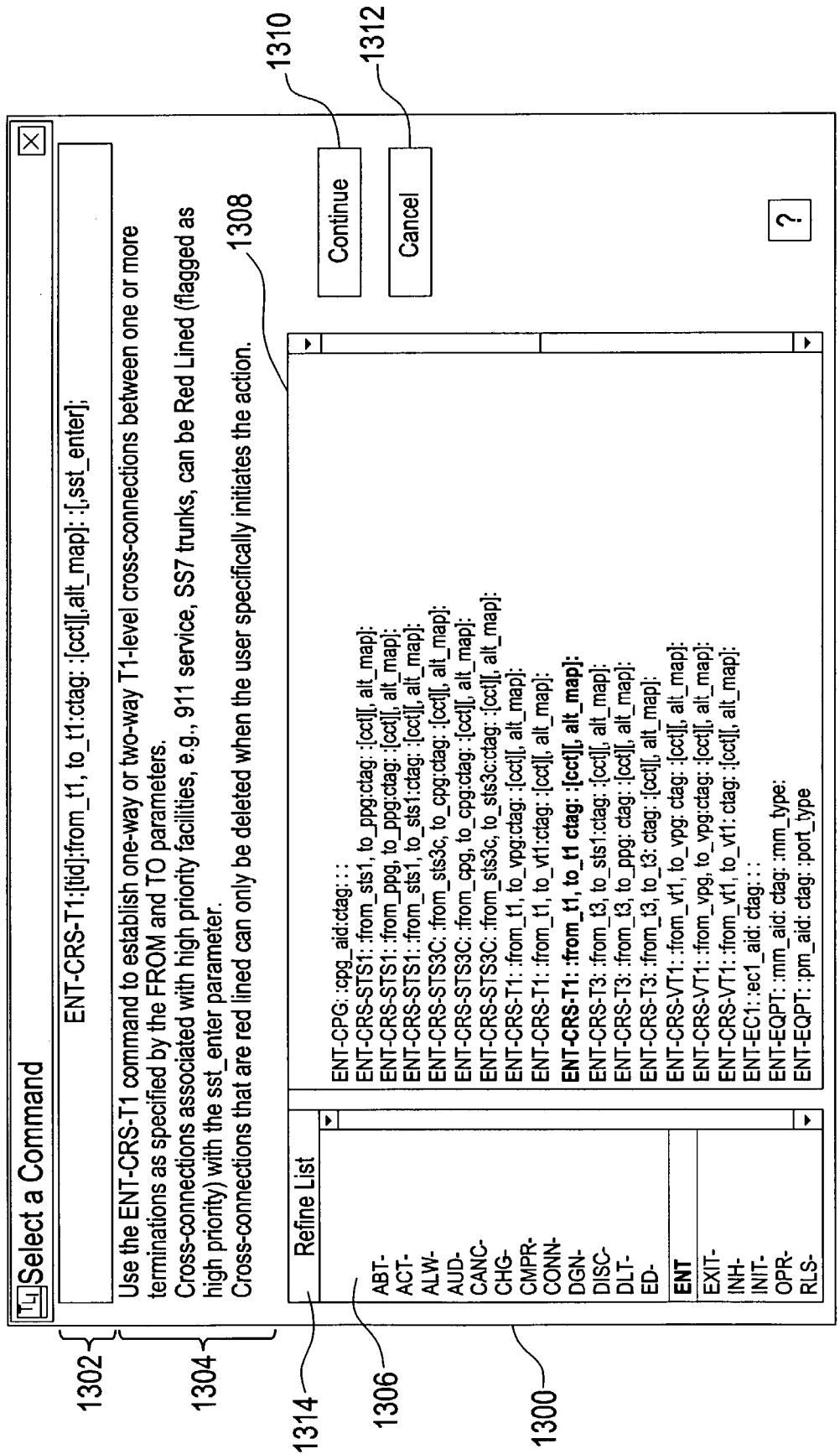
FIG. 13 is an exemplary embodiment of a user interface for selecting a command to be built utilizing the command builder.

FIG. 13 is an exemplary embodiment of a user interface for selecting a command to be built utilizing the command builder. The user interface is presented when the technician selects the command builder icon from the toolbar 208. The command builder helps the technician construct unfamiliar commands. The technician can select a command and by utilizing the on-line description, can quickly select the proper parameters. Very little retyping is required. Descriptions of the commands and parameters are on-screen and taken from the manual, thereby reducing the need for the technician to refer to the manual. The command builder screen 1300 depicted in FIG. 13 includes a list of possible starting character strings 1306 in a command along with a list of commands 1308 containing the starting string that is highlighted. The command builder screen 1300 is the first step in using the command builder. The user chooses the proper command from each of the two lists, the starting character strings 1306 and the list of commands 1308. Also included in the command builder screen 1300 is a refine list button 1314 that may be utilized to only display commands containing user specified text, making a command easier to find. The complete command form is displayed in a command box 1302 at the top of the command builder screen 1300. In addition, a description of the command 1304 selected from the list of commands 1308 is displayed. The description of the command 1304 may include an overview of the function of the command along with information about parameter values. When the technician locates the proper command to use in the command building process, the technician selects the continue button 1310 and flow proceeds to the screen depicted in FIG. 14 to continue building the selected command. At any time the technician may select the cancel button 1312 and exit from the command builder screen 1300.

Figure 14:
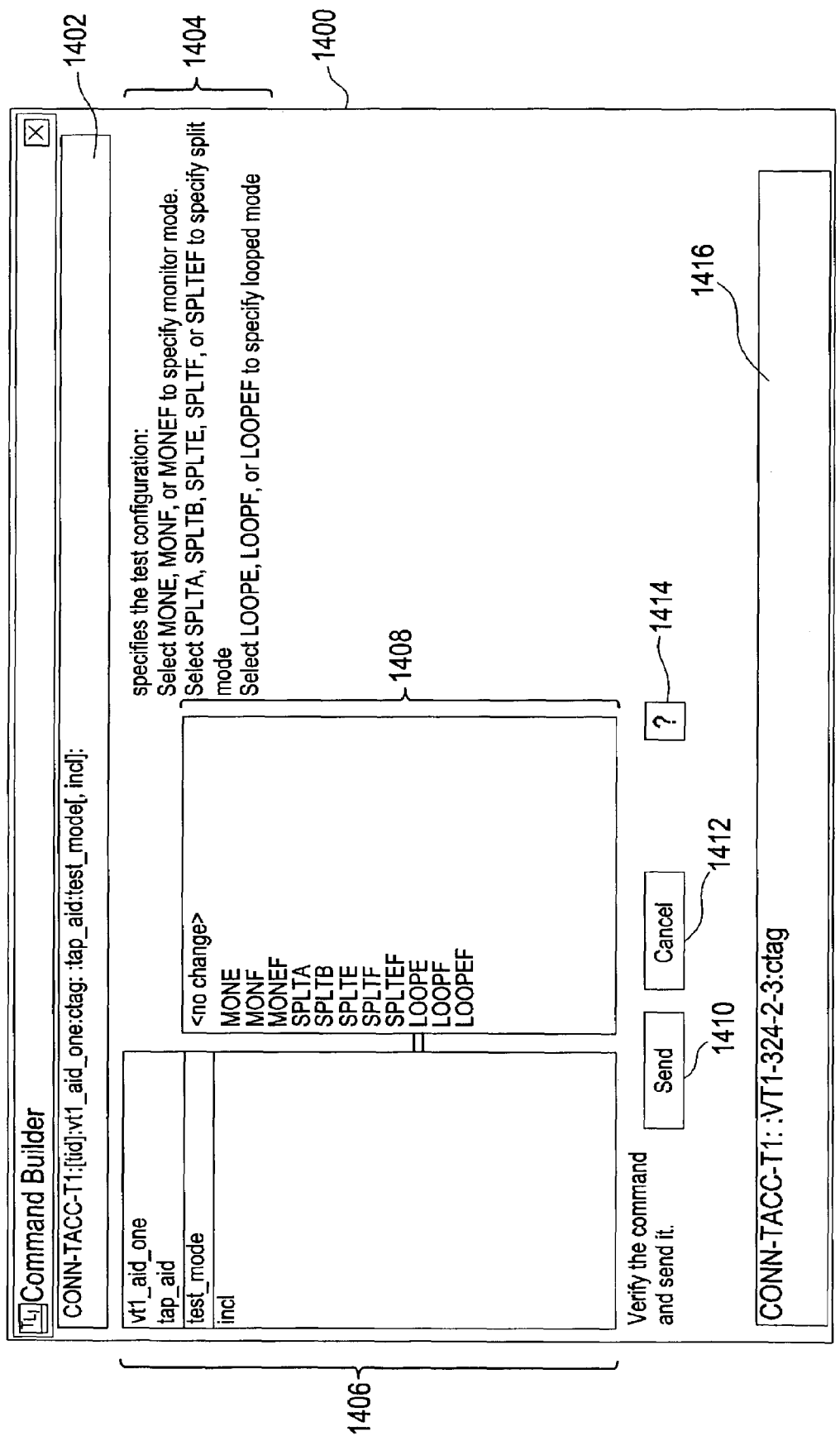
FIG. 14 is an exemplary embodiment of a user interface for inputting parameter values into a command being built utilizing the command builder.

FIG. 14 is an exemplary embodiment of a user interface for inputting parameter values into a command being built utilizing the command builder. The command builder parameter screen 1400 will help to assist the user in adding parameters and in sending the command. The left box 1406 contains a list of the command parameters. As a parameter is selected, a list of possible values for that parameter is displayed in the parameter entry box 1408. A description of the parameter and its possible values 1404 are displayed on the right side of the screen. Sometimes only an input box is displayed in the parameter entry box 1408. This occurs when it is necessary for the user to input a value rather than select it from a list. The complete command form 1402 is displayed at the top of the command builder parameter screen 1400. The completed command 1416 is constructed and displayed at the bottom of the screen as the user specifies parameter values. Required parameters must be specified before the user is allowed to send the command using the send button 1410. At any time the user may back out of the command builder by selecting the cancel button 1412. Also, the user may receive brief instructions by selecting the "?" button 1414.

Figure 15:
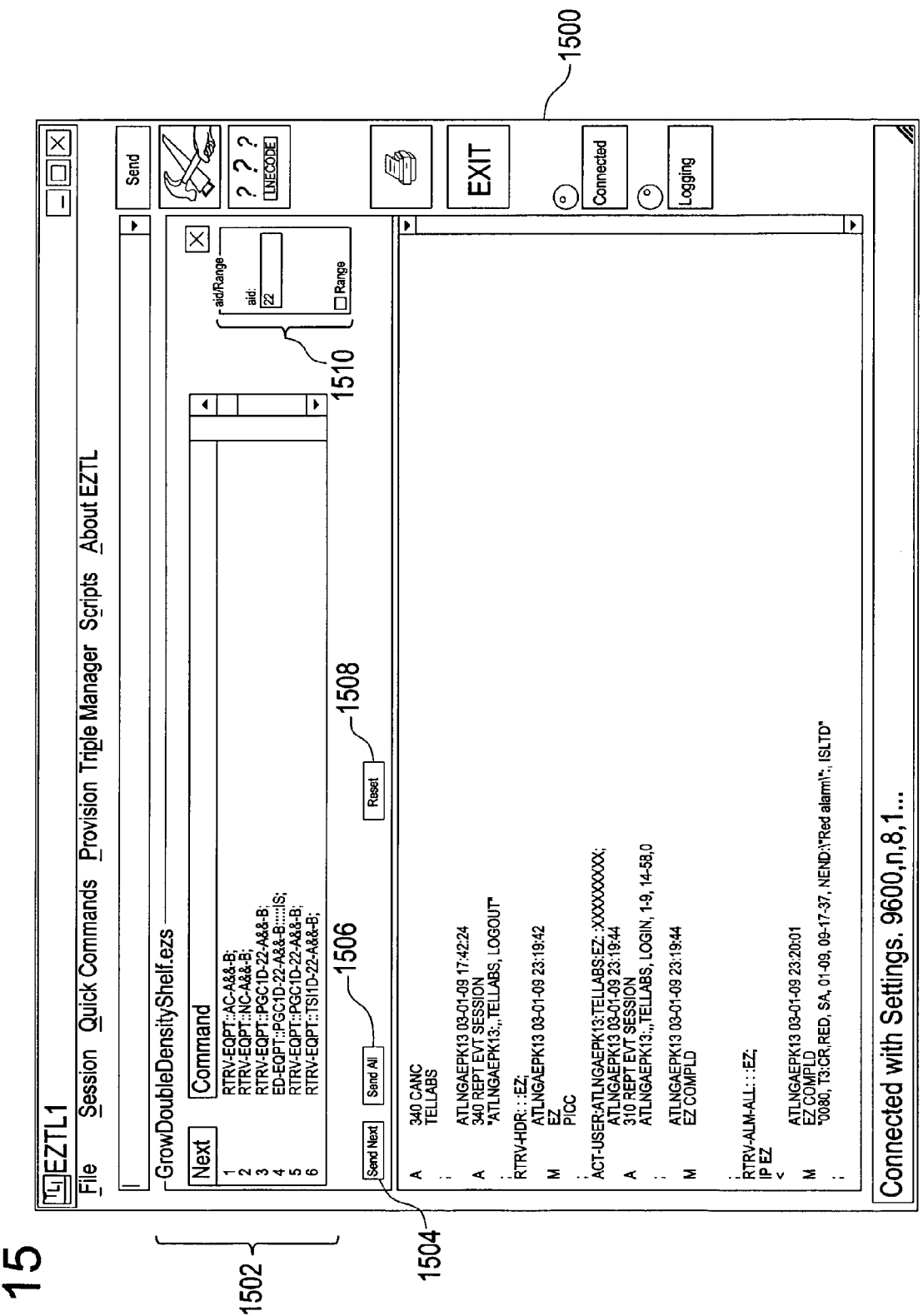
FIG. 15 is an exemplary embodiment of a user interface for running a script.

FIG. 15 is an exemplary embodiment of a user interface for running a script. To run a script, the user selects the run script option from the toolbar 208 or from the drop down menu associated with the scripts option on the main menu 202. This results in a script screen 1500 such as the one depicted in FIG. 15 being presented to the user. The commands included in the script 1502 are displayed on the script screen 1500 along with an address identification (AID) input box 1510 for the user to input the AID or AID/range. If any command uses the AID placeholder, then the user must specify an AID in the AID input box 1510. The user may also specify a range of AIDs in the AID input box 1510. The script would then be run for each value of AID in the specified range. The user may send only one command at a time by selecting the send next button 1504, or send them all at once by selecting send all button 1506. The user may select the reset button 1508 at any time to cancel the script. In addition, the TL1 commands being sent to the digital cross-connect system and the output data received from the digital cross-connect system are displayed on the script screen 1500. The user may create or modify a script by selecting the create script or modify script option on the pull-down menu associated with the scripts option on the main menu 202. The technician may type in each command or retrieve a command from the command builder or from a quick command.

Figure 16:
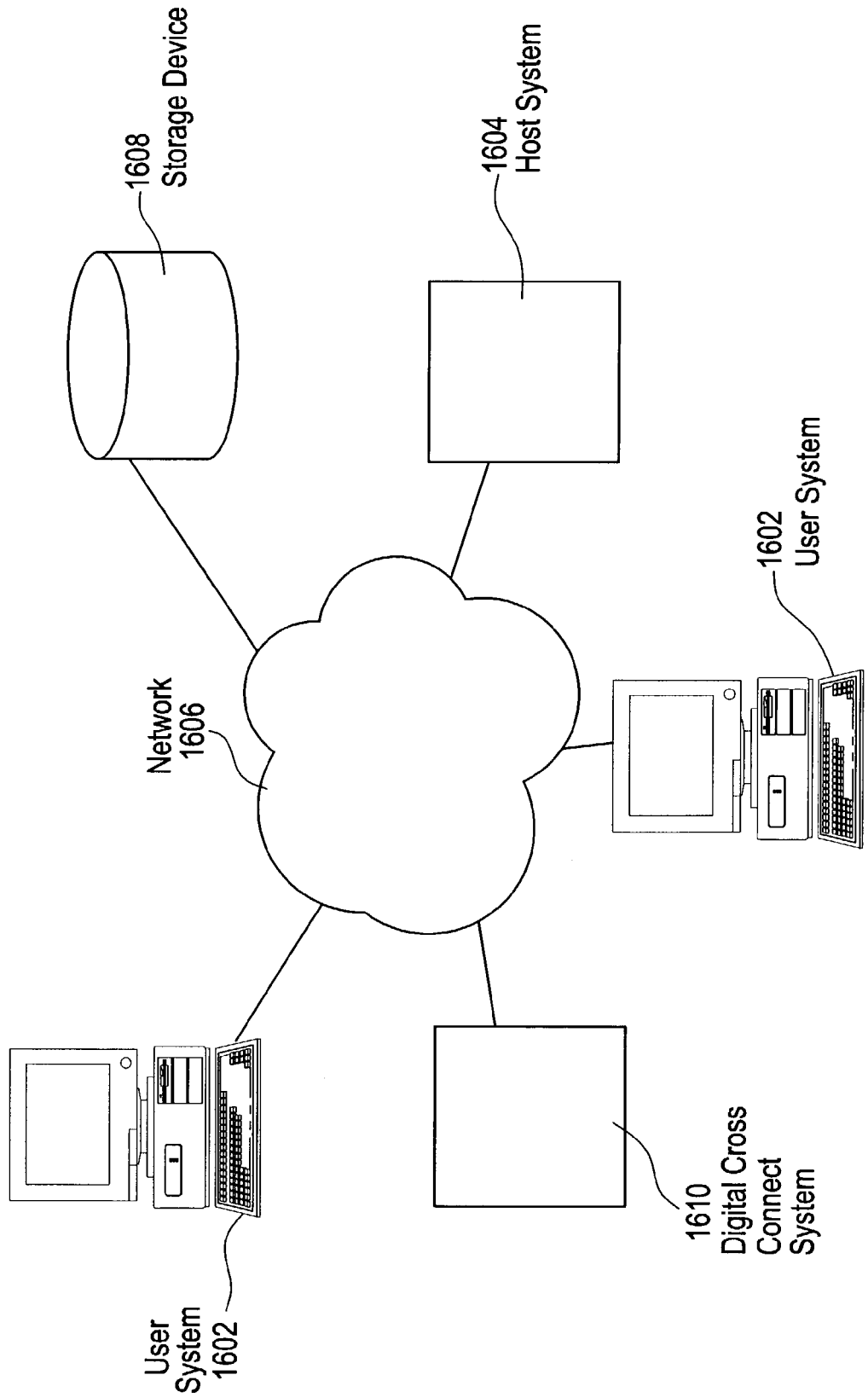
FIG. 16 is a block diagram of an exemplary system for providing a user interface for a digital cross-connect system.

In FIG. 16, a block diagram of an exemplary system for providing a user interface for a digital cross-connect system is generally shown. The system includes one or more user systems 1602 through which users at one or more geographic locations may contact the host system 1604 to send TL1 commands to the digital cross-connect system 1610. In an exemplary embodiment, the host system 1604 executes the user interface application program to send and receive commands from the digital cross-connect system 1610 via the network 1606. Additionally, the user systems 1602 are coupled to the host system 1604 via a network 1606. Each user system 1602 may be implemented using a general-purpose computer executing a computer program for carrying out the processes described herein. The user systems 1602 may be personal computers (e.g., a lap top, a personal digital assistant) or host attached terminals. If the user systems 1602 are personal computers, the processing described herein may be shared by a user system 1602 and the host system 1604 (e.g., by providing an applet to the user system 1602) or contained completely on the user system 1602.

The network 1606 may be any type of known network including, but not limited to, a wide area network (WAN), a local area network (LAN), a global network (e.g. Internet), a virtual private network (VPN), and an intranet. The network 1606 may be implemented using a wireless network or any kind of physical network implementation known in the art. A user system 1602 may be coupled to the host system through multiple networks (e.g., intranet and Internet) so that not all user systems 1602 are coupled to the host system 1604 through the same network. One or more of the user systems 1602, the digital cross-connect system 1610 and the host system 1604 may be connected to the network 1606 in a wireless fashion.

In an exemplary embodiment, the digital cross-connect system 1610 is a Tellabs Titan 5500, however, any digital cross-connect system 1610 known in the art may be utilized with an exemplary embodiment of the present invention. The TL1 command language may have to be modified slightly to accommodate digital cross-connect systems 1610 from different vendors. The digital cross-connect system 1610 takes receives TL1 commands from the host system 1604 and executes them. Output data is generated by the digital cross-connect system 1610 and transmitted back to the host system 1604 for display on the user system 1602. In an alternate embodiment, the user system 1602 includes a stand alone application for providing a user interface and communication occurs directly or via a network between the digital cross-connect system 1610 and the user system 1602.

The storage device 1608 may be implemented using a variety of devices for storing electronic information. It is understood that the storage device 1608 may be implemented using memory contained in the host system 1604 or the user system 1602 or it may be a separate physical device. The storage device 1608 is logically addressable as a consolidated data source across a distributed environment that includes a network 1606. Information stored in the storage device 1608 may be retrieved and manipulated via the host system 1604. The storage device 1608 includes application data such as: saved commands, generic commands and format information, and translation rules between the user interface and the TL1 commands. The storage device 1608 may also include other kinds of data such as information concerning the updating of the user interface and log data. In an exemplary embodiment, the host system 1604 operates as a database server and coordinates access to application data including data stored on storage device 1608.

The host system 1604 depicted in FIG. 16 may be implemented using one or more servers operating in response to a computer program stored in a storage medium accessible by the server. The host system 1604 may operate as a network server (e.g., a web server) to communicate with the user system 1602. The host system 1604 handles sending and receiving information to and from the user system 1602 and the digital cross-connect system 1610 and can perform associated tasks. The host system 1604 may also include a firewall to prevent unauthorized access to the host system 1604 and enforce any limitations on authorized access. For instance, an administrator may have access to the entire system and have authority to modify portions of the system. A firewall may be implemented using conventional hardware and/or software as is known in the art.

The host system 1604 may also operate as an application server. The host system 1604 executes one or more computer programs to provide a user interface for a digital cross-connect system 1610. Processing may be shared by the user system 1602 and the host system 1604 by providing an application (e.g., java applet) to the user system 1602. Alternatively, the user system 1602 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

As described above, the system to support a user interface for a digital cross-connect system may be configured in a variety of manners utilizing an exemplary embodiment of the present invention. All of the equipment (user system 1602, digital cross-connect system 1610, storage device 1608, host system 1604) may be located in a central office within one or more physical devices. For example the user system 1602, storage device 1608 and host system 1604 may be located in the same physical device with a connection to a separate digital cross-connect system 1610. In an alternate embodiment, the technicians are located in a different geographic location then the digital cross-connect system 1610. In this case the user system 1602, storage device 1608 and host system 1604 may be located in one geographic location and connected to the digital cross-connect system through the network 1606. In alternate embodiments, all of the equipment is located in different geographic locations and communicates through the network 1606. In addition, the user system 1602 may include the storage device 1608 and host system 1604. Alternatively, the user system 1602 may be located in a different geographic location than the host system 1604 and storage device 1608 with communication being provided by the network 1606. Other configurations known in the art are possible, and the above configurations are meant to be examples of some of the possibilities.

Once a technician has become comfortable with the user interface provided by an exemplary embodiment of the present invention, tasks can be completed in less time, with greater accuracy (e.g., fewer typographical errors) and with less dependency on the manuals and/or technical support personnel. This can result in cost savings due to increased technician productivity. An exemplary embodiment of the present invention may reduce the need for help from technical support personnel because of the ability to use GUI screens to guide less experienced technicians through the command creation process. In addition, the guidance provided by an exemplary embodiment of the present may reduce the chance of service affecting errors made by central office technicians. An embodiment of the present invention may be utilized proficiently by both experienced and inexperienced technicians because of the ability to drop in and out of the GUI menus. If a technician is an expert in some areas, the technician may enter TL1 commands directly as well as the user customized drop-down menus and the color-coded outputs. In addition, an embodiment of the present invention may be utilized as a learning tool because the resulting TL1 commands are visible to the technician utilizing user selection screen options.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for providing a user interface for a digital cross-connect system, the method comprising:
    displaying a user selection menu and a command line;
    receiving user input in response to said displaying;
    transmitting a TL1 command corresponding to said user input for execution on the digital cross-connect system in response to said user input including said TL1 command in said command line or in response to said user input including a selection from said user selection menu;
    displaying said TL1 command in response to said transmitting;
    receiving output data from the digital cross-connect system in response to said transmitting; and
    displaying said output data.

2. The method of claim 1 wherein said TL1 command is a provision command.

3. The method of claim 2 wherein said provision command is a provision T1 circuit command.

4. The method of claim 3 further comprising displaying two T1 data entry boxes, a facility selection menu corresponding to each said data entry box and text describing said provision T1 circuit command.

5. The method of claim 4 wherein said user input further includes T1 s entered into said T1 data entry boxes, facilities entered into said facility selection menu and a provision button selection.

6. The method of claim 2 wherein said provision command is a provision T1/VT1 facility command.

7. The method of claim 2 wherein said provision command is a provision T3/STS1 facility command.

8. The method of claim 1 wherein said TL1 command is a facility report command.

9. The method of claim 8 further comprising displaying a facility entry box and text describing said facility report command.

10. The method of claim 9 wherein said user input further includes a facility entered into said facility entry box.

11. The method of claim 1 wherein said TL1 command is a triple manager command.

12. The method of claim 11 further comprising displaying a triple selection menu and thee address input boxes.

13. The method of claim 12 wherein said user input further includes a triple type entered into said triple selection menu and three addresses entered into said input boxes.

14. The method of claim 1 wherein said TL1 command is created in response to said selection including a quick command option.

15. The method of claim 1 wherein said TL1 command is created in response to said selection including a command history option.

16. The method of claim 1 wherein said TL1 command is created in response to said selection including a command builder option.

17. The method of claim 16 further comprising displaying a list of commands, a complete command form; a parameter entry box; a completed command and text describing said command.

18. The method of claim 17 wherein said user input further includes a selected command form said list of commands and parameter data entered into said parameter entry box.

19. The method of claim 1 wherein said TL1 command is created in response to said selection including a run script option.

20. The method of claim 1 wherein said TL 1 command is created in response to said selection including a create script option.

21. The method of claim 1 wherein said TL1 command and said output data is color coded.

22. The method of claim 1 wherein said TL1 commands are displayed in blue and said output data is displayed in green.

23. The method of claim 1 wherein said output data is displayed in red in response to said output data including a critical alarm message.

24. A method for providing a user interface for a digital cross-connect system, the method comprising:
    displaying a user selection menu and a command line;
    receiving user input in response to said displaying; transmitting a TL1 command corresponding to said user input for execution on the digital cross-connect system in response to said user input including said TL1 commend in said command line or in response to said user input including a selection from said user selection menu, wherein:
        said TL1 command is a provision command in response to said selection including a provision option;
        said TL1 command is a facility report command in response to said selection including a facility report option; and
        said TL1 command is a triple manager command in response to said selection including a triple manager option; and
    displaying said TL1 command in response to said transmitting.

25. A computer program product for providing a front-end user interface for a digital cross-connect system, the computer program product comprising:
    a storage medium readable by a processing circuit and storing instructions for execution by the processing circuit for performing a method comprising:
    displaying a user selection menu and a command line;
    receiving user input in response to said displaying;
    transmitting a TL1 command corresponding to said user input for execution on the digital cross-connect system in response to said user input including said TL1 command in said command line or in response to said user input including a selection from said user selection menu;
    displaying said TL1 command in response to said transmitting;
    receiving output data from the digital cross-connect system in response to said transmitting; and
    displaying said output data.

26. A system for providing a user interface for a digital cross-connect system, the system comprising:
    a digital cross-connect system;
    a user system; and
    a host system in communication with said digital cross-connect system and said user system, said host system including instructions to implement a method comprising:
        displaying a user selection menu and a command line on said user system;
        receiving user input in response to said displaying from said user system;
        transmitting a TL1 command corresponding to said user input for execution on the digital cross-connect system in response to said user input including said TL1 command in said command line or in response to said user input including a selection from said user selection menu;
        displaying said TL1 command on said user system in response to said transmitting;
        receiving output data from said digital cross-connect system in response to said transmitting; and
        displaying said output data on said user system.

27. The system of claim 26 wherein said host system further includes a network in communication with said host system and said digital cross-connect system and wherein said host system and said digital cross-connect system are in communication via the network.

28. The system of claim 26 wherein said host system further includes a network in communication with said host system and said user system and wherein said host system and said user system are in communication via the network.

29. The system of claim 26 wherein said digital cross-connect system is a Tellabs T1 Titan 5500.

30. The system of claim 26 wherein the user interface is Windows based.

31. The system of claim 26 wherein the user interface is presented as a graphical user interface.

* * * * *